(12) United States Patent
Taherzadeh Boroujeni et al.

(10) Patent No.: US 12,317,264 B2
(45) Date of Patent: May 27, 2025

(54) INDICATING PUCCH REPETITION FACTOR USING REFERENCE SIGNAL OF PRECEDING PDCCH

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 807 days.

(21) Appl. No.: 17/455,900

(22) Filed: Nov. 19, 2021

(65) Prior Publication Data

US 2022/0272691 A1    Aug. 25, 2022

Related U.S. Application Data

(60) Provisional application No. 63/151,595, filed on Feb. 19, 2021.

(51) Int. Cl.
*H04W 72/21* (2023.01)
*H04L 5/00* (2006.01)
*H04W 72/23* (2023.01)

(52) U.S. Cl.
CPC .......... *H04W 72/21* (2023.01); *H04L 5/0048* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 11,330,587 B2* | 5/2022 | Ljaz | H04W 72/21 |
| 2017/0019216 A1* | 1/2017 | Li | H04L 1/08 |
| 2017/0290001 A1* | 10/2017 | Axmon | H04W 72/0446 |
| 2019/0182807 A1* | 6/2019 | Panteleev | H04L 5/0048 |
| 2020/0178287 A1* | 6/2020 | Kim | H04W 72/23 |
| 2020/0296747 A1* | 9/2020 | Kim | H04L 5/0053 |
| 2022/0225322 A1* | 7/2022 | Shim | H04L 1/08 |
| 2022/0225363 A1* | 7/2022 | Shim | H04L 1/08 |
| 2022/0232609 A1* | 7/2022 | Lee | H04L 1/1671 |
| 2023/0087223 A1* | 3/2023 | Jang | H04L 1/1896 370/329 |
| 2023/0388061 A1* | 11/2023 | Shen | H04L 5/0055 |
| 2023/0421310 A1* | 12/2023 | Ying | H04W 72/51 |
| 2024/0015748 A1* | 1/2024 | Kittichokechai | H04L 1/08 |
| 2024/0137179 A1* | 4/2024 | Abebe | H04W 52/42 |

* cited by examiner

*Primary Examiner* — Hassan A Phillips
*Assistant Examiner* — Gautam Sharma
(74) *Attorney, Agent, or Firm* — Procopio, Cory, Hargreaves & Savitch LLP

(57) ABSTRACT

A base station may transmit, to a user equipment (UE), a reference signal (RS) associated with a physical downlink control channel (PDCCH) for scheduling a physical downlink shared channel (PDSCH), the RS indicating a repetition factor for a PUCCH from the UE. The UE may determine the repetition factor for the PUCCH based on at least one parameter of the RS transmitted with the PDCCH, and repeat the transmission of the PUCCH to the base station based on the repetition factor indicated by the RS associated with the PDCCH. The PDCCH may include an indication of a dynamic PUCCH repetition factor, and the RS may indicate the UE to apply the dynamic PUCCH repetition factor. The RS may include the demodulating RS (DM-RS) received with the PDCCH.

30 Claims, 10 Drawing Sheets

INDICATING PUCCH REPETITION FACTOR USING REFERENCE SIGNAL OF PRECEDING PDCCH

CROSS REFERENCE TO RELATED APPLICATION(S)

This application claims the benefit of and priority to U.S. Provisional Application Ser. No. 63/151,595, entitled "INDICATING PUCCH REPETITION FACTOR USING REFERENCE SIGNAL OF PRECEDING PDCCH" and filed on Feb. 19, 2021, which is expressly incorporated by reference herein in its entirety.

TECHNICAL FIELD

The present disclosure relates generally to communication systems, and more particularly, to a method and apparatus for wireless communication including indicating repetition factor.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and user equipment (UE). The base station may transmit, to the UE, a reference signal (RS) associated with a physical downlink control channel (PDCCH) that schedules a physical downlink shared channel (PDSCH), the RS indicating a repetition factor for a physical uplink control channel (PUCCH) from the UE. The RS may include the demodulation RS (DM-RS) received with the PDCCH.

The UE may determine the repetition factor for the PUCCH based on at least one parameter of the RS transmitted with the PDCCH and repeat the transmission of the PUCCH to the base station based on the repetition factor indicated by the RS associated with the PDCCH. At least one parameter of the RS indicating the repetition factor for the PDCCH may include one or more of an RS sequence, a port for the RS from which the base station transmits the RS, or an orthogonal cover code (OCC) applied to the RS.

The relationship between the and the repetition factor of the PUCCH may be based on one or more properties of the corresponding PUCCH, and the properties of the corresponding PUCCH may include a PUCCH resource set configuration, size or content of uplink control information (UCI) included in the PUCCH, or a PUCCH format for the PUCCH. The relationship between the RS and the repetition factor of the PUCCH may also be based on one or more properties of the PDCCH, and the properties of the PDCCH may include a search space associated with the PDCCH, a control resource set (CORESET) configuration for the PDCCH, or a downlink control information (DCI) size included in the PDCCH.

The base station may transmit an RRC configuring the relationship between at least one parameter of the RS and the repetition factor for the PUCCH. The PDCCH may include an indication of a dynamic PUCCH repetition factor, and the RS may indicate the UE to apply the dynamic PUCCH repetition factor to the PUCCH that is not associated with the PDSCH scheduled by the PDCCH. The indication of the dynamic PUCCH repetition factor may be included in the DCI. The dynamic PUCCH repetition factor includes at least one of aggregation level of the PDCCH or a location of a first CCE of the PDCCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
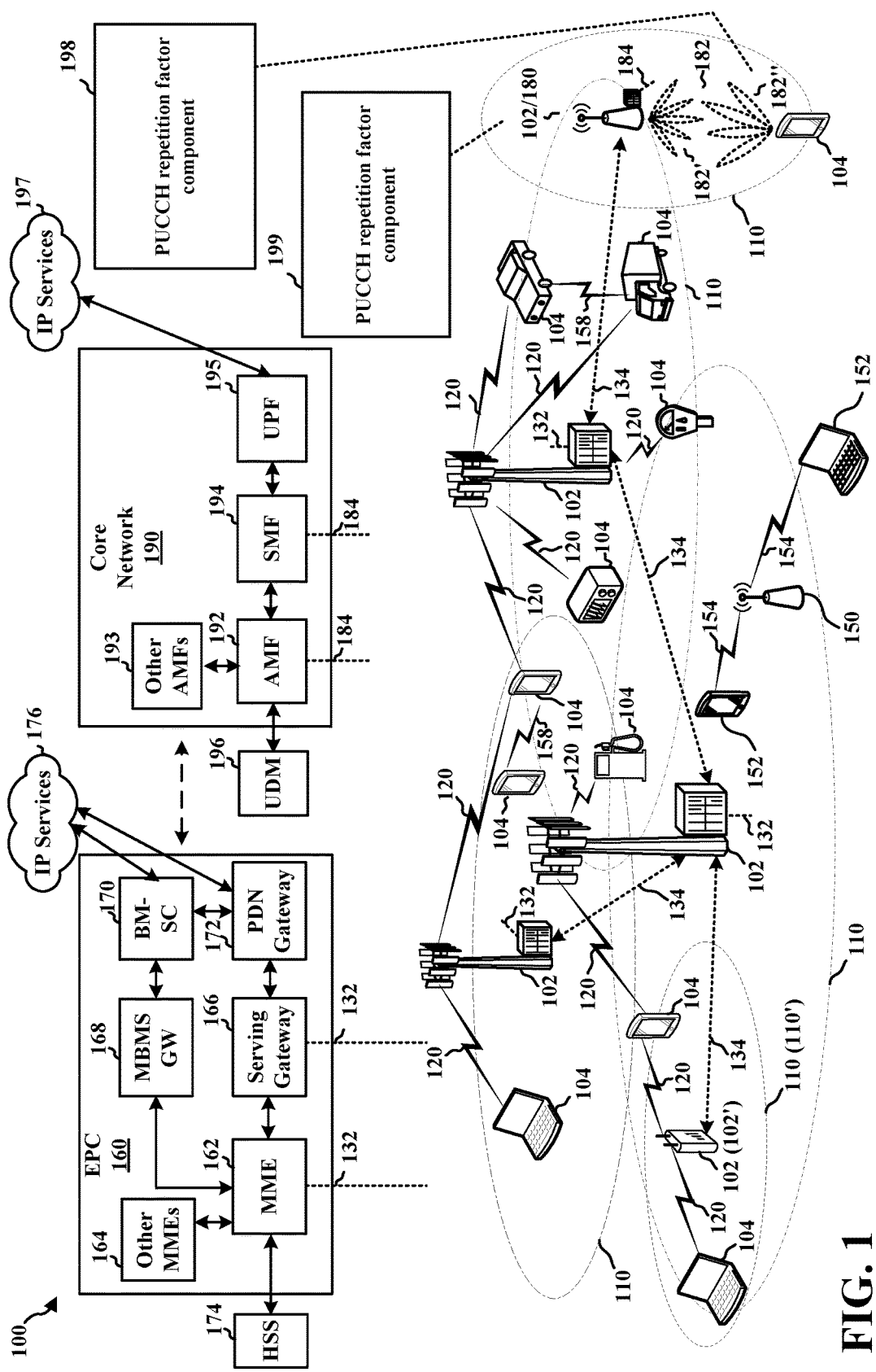
FIG. 1 is a diagram illustrating an example of a wireless communications system and an access network.

A dynamic configuration of a physical uplink control channel (PUCCH) repetition may be provided to enhance the signal coverage of wireless communication. The network may use a demodulation reference signal (DMRS) of a physical downlink control channel (PDCCH) to indicate a repetition factor of the PUCCH. The UE may transmit the PUCCH based on the repetition factor indicated by the DMRS of the PDCCH.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a PUCCH repetition factor component 198 configured to receive, from a base station, RS associated with a PDCCH scheduling a PDSCH, extract the repetition factor for a PUCCH based on at least one parameter of the RS transmitted with the PDCCH, and repeat transmission of the PUCCH to the base station based on a repetition factor indicated by the RS associated with the PDCCH. In certain aspects, the base station 180 may include a PUCCH repetition factor component 199 configured to transmit, to a UE, an RS associated with a PDCCH for scheduling a PDSCH, the RS indicating a repetition factor for a PUCCH from the UE, and receive, from the UE, repeated transmissions of the PUCCH based on the repetition factor indicated by the RS associated with the PDCCH.

Although the following description may be focused on 5G NR, the concepts described herein may be applicable to other similar areas, such as LTE, LTE-A, CDMA, GSM, and other wireless technologies.

Figure 2:
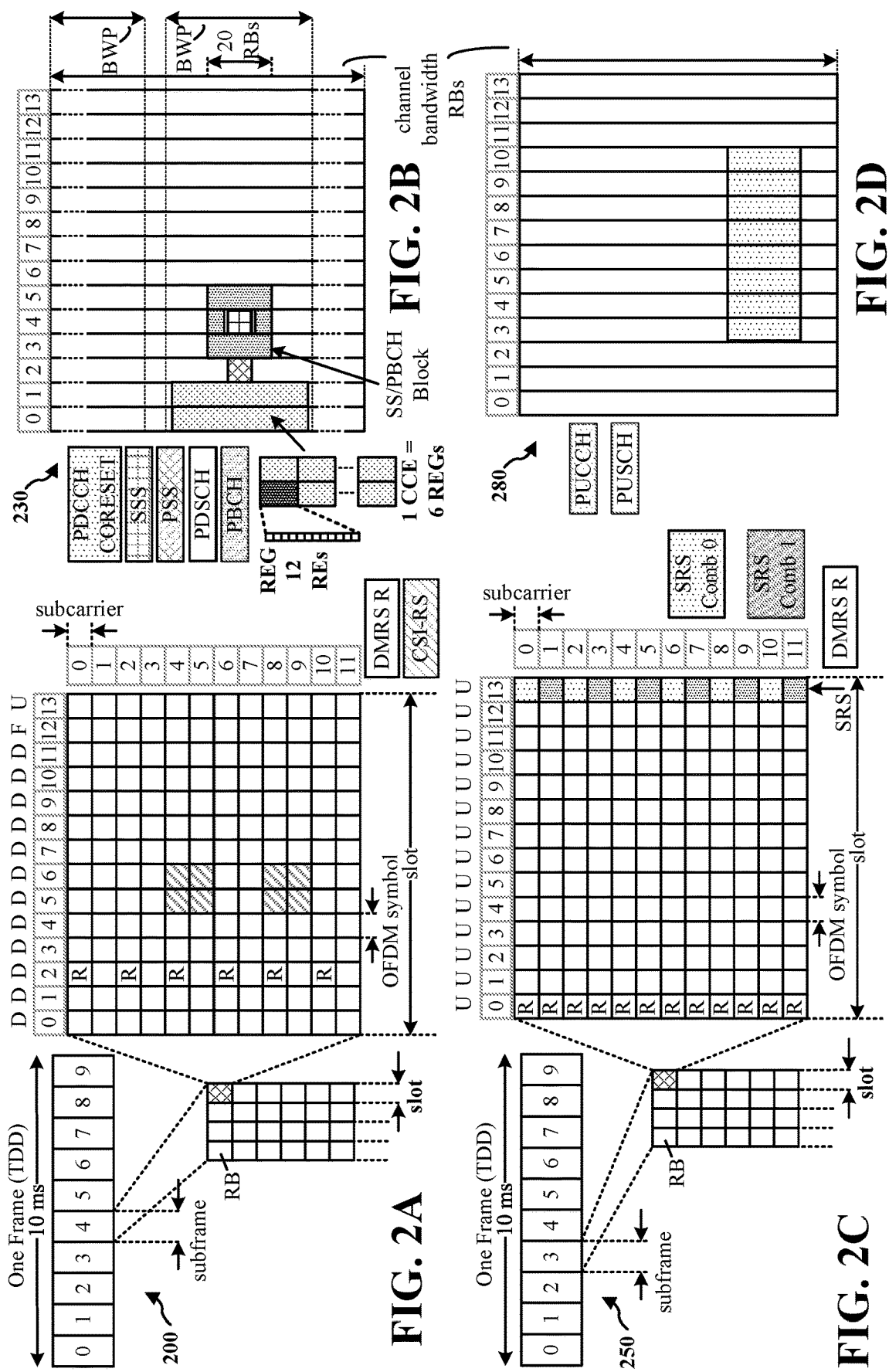
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
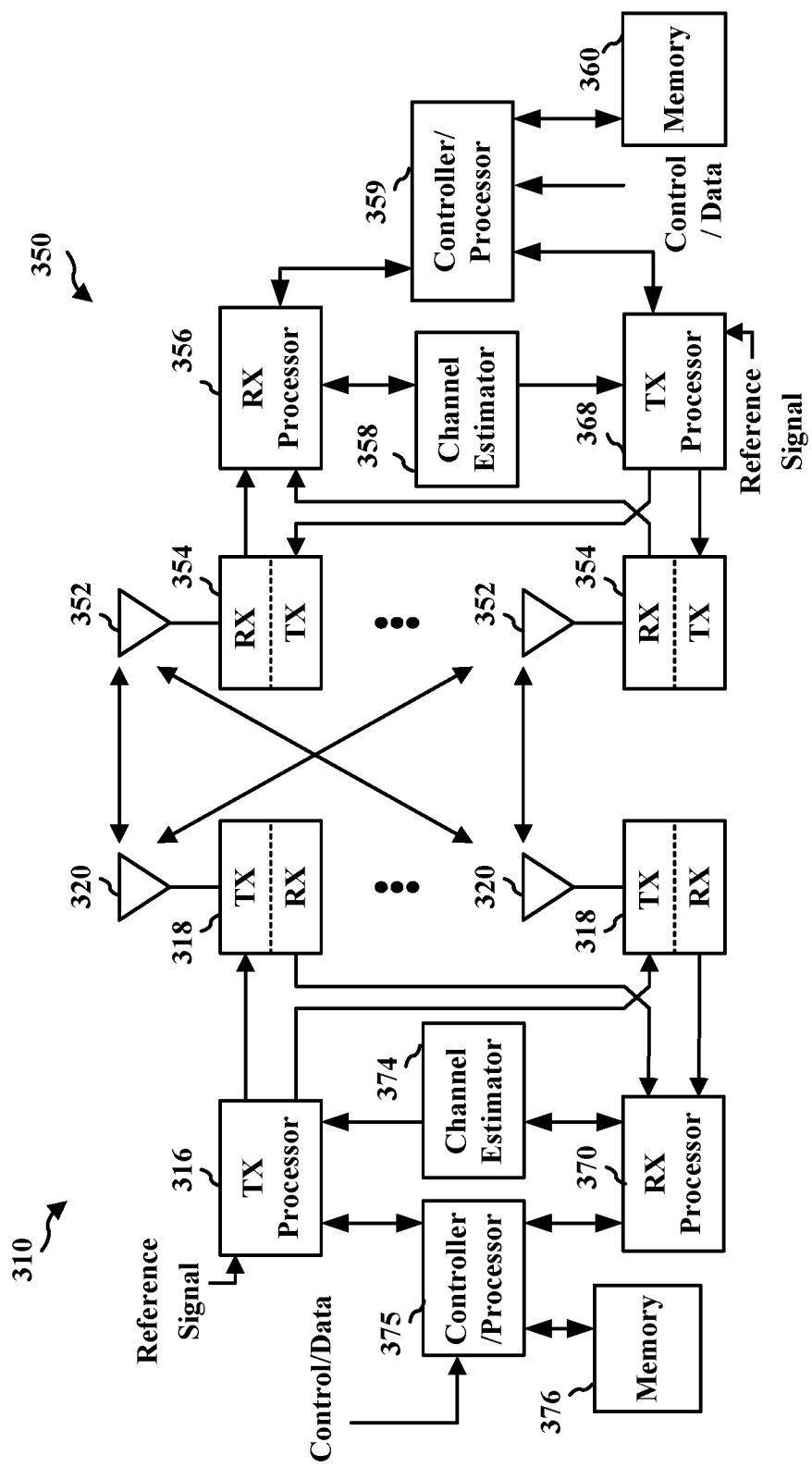
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

A base station may indicate a repetition factor to a UE for repetitions of uplink transmissions, such as PUCCH. In some aspects, the PUCCH repetition may be implied to the UE based on preceding downlink channel signaling using a relationship rather than explicit signaling of a repetition factor as a bit or field in a payload of the preceding downlink channel signaling. In some aspects, the indication of the PUCCH repetition factor may provide a signaling mechanism to support dynamic PUCCH repetition factor indication. In some aspects, a reference signal of the preceding downlink channel signal may support the indication of the PUCCH repetitions. For example, a demodulation reference signal (DM-RS) of a preceding downlink signal may provide an indication of a repetition factor for the PUCCH. That is, the base station may indicate the PUCCH repetition using the DM-RS of the PDCCH, e.g., a PDCCH that schedules PDSCH. In some aspects, the repetition factor may be indicated by an aggregation of a PDCCH.

In some aspects, the base station may transmit downlink channels to a UE for data communication. For example, the downlink channels may include a physical downlink control channel (PDCCH) or a physical downlink shared channel (PDSCH). Among other types of control signaling, a PDCCH may carry scheduling information for a PDSCH that the base station will transmit to a UE. The base station may also transmit the DM-RS associated with the downlink channel to the UE, e.g., with PDCCH and/or PDSCH. That is, the base station may generate and transmit, to the UE, channel-specific DM-RSs for each downlink channel, including the PDCCH and the PDSCH. The UE may use the DM-RS to receive the PDCCH and/or PDSCH. For example, the UE may perform channel estimation using the DM-RS and may use the channel estimation to receive the PDCCH or PDSCH.

The DM-RS associated with the PDCCH may be mapped on all resource element groups (REGs) on all the orthogonal frequency division multiplexing (OFDM) symbols of a given PDCCH candidate. In some aspects, the DM-RS density may be the same on all REGs, and DM-RS positions may be evenly-distributed within the REG. In one aspect, the DM-RS density per the REG may be ¼ for normal CP (NCP) and extended CP (ECP). In one aspect, the RE position of the DM-RSs may be #1, #5, #9, etc.

In some aspects, some configurable IDs for PDCCH DM-RS may be configured for the UE at least for the initialization of DM-RS sequence/scrambling. In one aspect, for each CORESET configured by the PBCH, the PCI may be used for DM-RS sequence initialization. That is, the UE may perform DM-RS sequence initiation based on the PCI. In another aspect, for each CORESET configured by remaining minimum system information (RMSI), the RMSI may provide the UE with the configurable ID for the DM-RS sequence initialization. If the RMSI does not provide the configurable ID for DM-RS sequence initialization, the UE may use the PCI for the DM-RS sequence initialization. For example, the value range of the configurable ID may be the same as that for the PCI, e.g., ten (10) bits.

In another aspect, for each CORESET configured by UE-specific RRC signaling, the UE may be configured with a configurable ID, $N_{ID}^{(nSCID)}$ for the DM-RS sequence initialization. Here, $N_{ID}^{(nSCID)}$ may refer to sixteen (16) bit scrambling ID with a default value of physical cell ID and six (6) known bits (e.g., '000000').

In some aspects, the DM-RS and the PDCCH, after coding, may be scrambled by the same pseudo-random sequences, e.g., the same length-31 Gold sequence.

In some aspects, the DM-RS sequence for the PDCCH may be obtained according to a reference point in the frequency-domain. In one aspect, the DM-RS sequence for the PDCCH may be obtained according to a first physical resource block (PRB 0) of common PRB indexing for the UE-specific CORESET. In another aspect, the DM-RS sequence for the PDCCH may be obtained according to a PRB 0 of the initial active DL BWP for the CORESET configured by the PBCH/RMSI. Also, the QCL configuration/indication may be provided on a per CORESET basis.

Aspects presented herein enable a base station to indicate the PUCCH repetition factor to a UE based on the DM-RS of a PDCCH preceding the PUCCH. That is, the base station may indicate a PUCCH repetition configuration including at least one of the PUCCH repetition factor via the selection of one or more parameters of the DM-RS. For example, the DM-RS sequence, as selected from a set of DM-RS sequences, may indicate a particular repetition factor. For example, a first DM-RS sequence may correspond to a first PUCCH repetition factor, a second DM-RS sequence may correspond to a second PUCCH repetition factor, and so forth. If the base station transmits DM-RS using the first DM-RS sequence, the UE may determine that the base station is indicating for the UE to use the first PUCCH repetition factor even though the base station does not explicitly signal a repetition factor parameter to the UE. In some aspects, the port that the base station uses to transmit the DM-RS with the PDCCH may indicate a particular PUCCH repetition factor to the UE. For example, a first antenna port may be associated with a first PUCCH repetition factor, a second antenna port may be associated with a second PUCCH repetition factor, and so forth. If the base station transmits the DM-RS with the PDCCH using the second antenna port, the UE may determine that the base station is indicating to use the second PUCCH repetition factor. In some aspects, the orthogonal cover code (OCC) of the DM-RS for a preceding PDCCH may indicate a PUCCH particular repetition factor to the UE. For example, a first OCC may be associated with a first PUCCH repetition factor, a second OCC may be associated with a second PUCCH repetition factor, a third OCC may be associated with a third PUCCH repetition factor, and so forth. If the base station transmits the DM-RS with the PDCCH using the third OCC, the UE may determine that the base station is indicating to use the third PUCCH repetition factor.

In some aspects, the base station may use the parameters of the DM-RS to indicate the applicability of the PUCCH repetition factor. For example, the DM-RS transmitted with a PDCCH may indicate whether the repetition factor applies for a PUCCH that is not associated with the PDSCH scheduled by the PDCCH. As discussed above, the base station may indicate the repetition factor applicability via the selection of the DM-RS sequence, port, and/or an orthogonal cover code (OCC) for the DM-RS transmitted with a preceding PDCCH.

The base station may indicate the PUCCH repetition factor based on a relationship between one or more parameters of the DM-RS and a set of potential PUCCH repetition factors. The DM-RS, transmitted by the base station along with PDCCH, may indicate, to the UE, the PUCCH repetition factor to use when transmitting PUCCH. The PUCCH may be associated with a PDSCH. In some examples, the PDSCH may be scheduled by the PDCCH with which the DM-RS is transmitted. For example, the PUCCH may comprise ACK/NACK feedback for the PDSCH. Thus, the DM-RS that is transmitted with PDCCH scheduling a PDSCH may indicate a PUCCH repetition factor for the UE to transmit ACK/NACK feedback for the PDSCH.

The UE may repeat the transmission of the PUCCH associated with the PDSCH associated with the PDCCH based on the PUCCH repetition factor indicated by the DM-RS of the PDCCH.

The base station may also instruct the UE with the parameters of the applicability of the PUCCH repetition factor for one or more subsequent PUCCHs that may or may not be associated with the PDSCH associated with the PDCCH. For example, the repetition factor may be applicable for a type of PUCCH. The UE may determine to repeat the transmission of the PUCCH based on the parameters of the applicability of the PUCCH repetition factor indicated by the DM-RS of the PDCCH, regardless of whether the PUCCH is associated with the PDSCH associated with the PDCCH of the DM-RS indicating the parameters of the applicability of the PUCCH repetition factor.

In one aspect, the base station may select the DM-RS sequence to indicate the UE of the PUCCH repetition configuration. The UE, after receiving the DM-RS sequence, may apply the PUCCH repetition configuration corresponding to the received DM-RS sequence for transmitting the associated PUCCH to the base station. In another aspect, the base station may select the DM-RS port for transmitting the DM-RS to the UE to indicate the UE of the PUCCH repetition configuration. The UE may apply the PUCCH repetition configuration corresponding to the DM-RS port, from which the base station transmitted the DM-RS of the PDCCH, for transmitting the associated PUCCH to the base station. In yet another aspect, the base station may select the OCC of the DM-RS to indicate the UE of the PUCCH repetition configuration. The UE may apply the PUCCH repetition configuration corresponding to the OCC of the received DM-RS for transmitting the associated PUCCH to the base station.

In order for the base station to use DM-RS to indicate a particular PUCCH repetition factor to a UE, a relationship may be configured between one or more parameters of the DM-RS and a set of potential PUCCH repetition factors. For example, a relationship may be configured between a first DM-RS sequence and a first repetition factor, a second DM-RS sequence and a second repetition factor, a third DM-RS sequence and a third repetition factor, and so forth, as shown in Table 1. Additionally, or alternatively, a relationship may be configured between particular repetition factors and one or more antenna ports or one or more OCCs, as shown in Table 2.

TABLE 1

| DM-RS sequence | Repetition Factor |
| --- | --- |
| DM-RS sequence 1 | First repetition factor |
| DM-RS sequence 2 | Second repetition factor |

TABLE 1-continued

| DM-RS sequence | Repetition Factor |
| --- | --- |
| DM-RS sequence 3 | Third repetition factor |
| . . . | . . . |

TABLE 2

| Port | Repetition Factor |
| --- | --- |
| Port 1 | First repetition factor |
| Port 2 | Second repetition factor |
| . . . | . . . |

TABLE 3

| OCC | Repetition Factor |
| --- | --- |
| OCC 1 | First repetition factor |
| OCC 2 | Second repetition factor |
| . . . | . . . |

In some aspects, the base station may signal or configure the relationship between one or more parameters of the DM-RS and the PUCCH repetition configuration in RRC signaling to the UE. The relationship may include at least one of the PUCCH repetition factors or parameters of the applicability of the PUCCH repetition and correspondence to at least one of the DM-RS sequence, the DM-RS port, or the OCC of the DM-RS. That is, the base station may establish the relationship between the PUCCH repetition configuration and the DM-RS of PUCCH with the UE in the process of establishing the RRC connection with the UE. In one aspect, the base station may configure or signal the relationship between the PUCCH repetition configuration and the DM-RS pf PUCCH a part of the configuration of PUCCH resource set for the UE. In another aspect, the base station may configure or signal the relationship between the PUCCH repetition configuration and the DM-RS as a part of the CORESET configuration for the UE.

In some aspects, the relationship between the PUCCH repetition factor and the DM-RS of the PDCCH preceding the PUCCH may depend on at least one of the PUCCH resource sets, the UCI size, the PUCCH format, or the UCI content. Thus, the UE may determine the PUCCH repetition factor based on the DM-RS received with the PDCCH and further based on one or more of the PUCCH resource set, the UCI size, the PUCCH format, or the UCI content for the PUCCH for which the repetition factor is being determined. In one aspect, the base station may configure a relationship between a PUCCH repetition factor and the DM-RS of the PDCCH to be applied for certain PUCCH resource sets, UCI size or content, or format of the PUCCH, and not for other PUCCH resource sets, UCI size or content, or the format of the PUCCH. In another aspect, the PUCCH repetition factor indicated by the DM-RS of the PDCCH may be configured to differently apply for different PUCCH resource sets, different UCI sizes or contents, or different format of the PUCCH. For example, the relationship between the PUCCH repetition factor and the DM-RS of the PDCCH may be configured so that the indicated PUCCH repetition factor may be applied to PUCCH, including UCI carrying the L1 report, and not for PUCCH not including the UCI carrying the L1 report.

In some aspects, the relationship between the PUCCH repetition factor and the DM-RS of a preceding PDCCH may depend on other associated properties of the PDCCH, e.g., size or content of DCI, the associated search space, or the associated CORESET. For example, the base station may indicate the relationship between the PUCCH repetition factor and the DM-RS as a part of the CORESET configuration may depend on the associated CORESET of the PDCCH.

In one aspect, the relationship between the PUCCH repetition factor and the DM-RS of the PDCCH may be applied to the DM-RS of the PDCCH including fallback DCI to indicate the PUCCH repetition factor to the UE and the relationship between the PUCCH repetition factor and the DM-RS of the PDCCH may not be applied to the DM-RS of the PDCCH including non-fallback DCI. The non-fallback DCI may explicitly indicate the PUCCH repetition factor for the associated PUCCH. The UE may determine the PUCCH repetition factor using the indication of the DM-RS for PDCCH including fallback DCI, and may determine the PUCCH repetition factor in another manner for PDCCH including non-fallback DCI.

In another aspect, the UE may determine the PUCCH repetition factor based on the relationship between the repetition factor and the DM-RS transmitted with the PDCCH for PDCCH received in UE-specific search spaces. If the PDCCH is received in a common search space, the UE may not determine the PUCCH repetition factor based on the DM-RS transmitted with the PDCCH.

In one aspect, the DM-RS of PDCCH that may schedule a PDSCH may indicate the repetition factor for the associated PUCCH that carries its ACK/NACK. That is, the base station may transmit the PDCCH that may schedule the PDSCH, the UE may transmit the PUCCH carrying the ACK/NACK message to the base station. The PUCCH carrying the ACK/NACK message associated with the PDSCH scheduled by the PDCCH may be repeatedly transmitted based on the PUCCH repetition factor indicated by the DM-RS of the PUCCH.

In some aspects, the DM-RS of the PDCCH that schedules a PDSCH may indicate the parameters of the applicability of the PUCCH repetition factor, indicating whether a dynamic PUCCH repetition factor may be valid for PUCCHs, which may or may not be associated with the scheduled PDSCH. The dynamic PUCCH repetition factor may be indicated via other means. In one aspect, the dynamic PUCCH repetition factor may be indicated by the DCI, e.g., via the PUCCH resource indicator (PRI) of the DCI. In another aspect, the dynamic PUCCH repetition factor may be indicated by at least one of the aggregation level of PDCCH or the location of the first control channel element of the PDCCH. The DM-RS of the PDCCH may indicate the parameters of the applicability of the configured dynamic PUCCH repetition factor.

Figure 4:
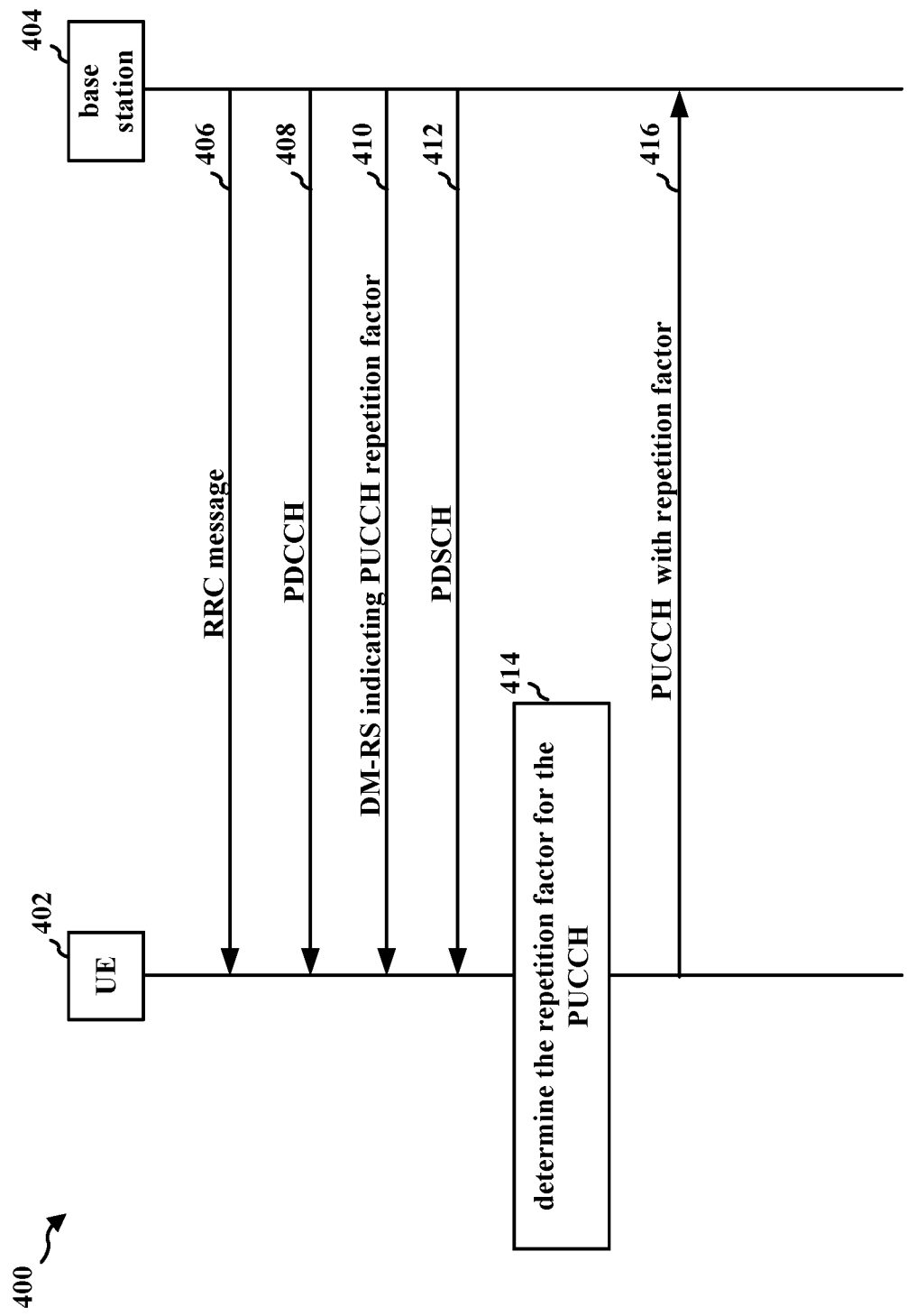
FIG. 4 is a communication diagram of a method of wireless communication.

FIG. 4 is a call-flow diagram 400 of a method of wireless communication. The call-flow diagram 400 may include a UE 402 and a base station 404. The base station 404 may transmit, to the UE 402, an RS associated with a PDCCH scheduling a PDSCH, the RS indicating a repetition factor for a PUCCH from the UE 402. The UE 402 may determine or extract the repetition factor for the PUCCH based on at least one parameter of the RS transmitted with the PDCCH, and repeat the transmission of the PUCCH to the base station 404 based on the repetition factor indicated by the RS associated with the PDCCH. Here, extracting the repetition factor for the PUCCH may refer to the UE 402 determining or retrieving the repetition factor for the PUCCH based on at least one parameter of the RS transmitted with the PDCCH, where the base station 404 has configured as the at least one parameter of the RS to indicate the repetition factor for the PUCCH. The base station 404 may transmit, to the UE 402, an RRC configuring the relationship between at least one parameter of the RS and the repetition factor for the PUCCH. The PDCCH may include an indication of a dynamic PUCCH repetition factor, and the RS may indicate the UE 402 to apply the dynamic PUCCH repetition factor. The RS may include the DM-RS received with the PDCCH.

At 406, the base station 404 may transmit, to the UE 402, an RRC message including a configuration of a relationship between at least one parameter of the RS and the repetition factor for the PUCCH. The UE 402 may receive, from the base station 404, an RRC message including a configuration of a relationship between at least one parameter of the RS and the repetition factor for the PUCCH. In one aspect, the configuration of the relationship between the at least one parameter of the RS and the repetition factor may be further based on at least one of a PUCCH resource set configuration or a CORESET configuration for the PDCCH. Here, the at least one parameter of the RS may include one or more of an RS sequence, a port for the RS, or an OCC applied to the RS. In one aspect, the RS sequence of the RS may indicate the repetition factor for the PUCCH. In another aspect, the RS port from which the base station 404 transmits the RS may indicate the repetition factor for the PUCCH. In another aspect, the OCC of the RS may indicate the repetition factor for the PUCCH.

At 408, the base station 404 may transmit, to a UE 402, a PDCCH for scheduling a PDSCH. The UE 402 may receive, from the base station 404, the PDCCH for scheduling a PDSCH. In one aspect, the PDCCH may include an indication of a dynamic PUCCH repetition factor. In one example, the PDCCH may include DCI including the indication of the dynamic PUCCH repetition factor. In another example, the indication of the dynamic PUCCH repetition factor may include at least one of an aggregation level of the PDCCH or a location of a first CCE of the PDCCH.

At 410, the base station 404 may transmit, to the UE 402, an RS associated with the PDCCH for scheduling a PDSCH, the RS indicating a repetition factor for a PUCCH from the UE 402. The UE 402 may receive, from the base station 404, an RS associated with the PDCCH scheduling a PDSCH. The RS may include a DMRS transmitted with the PDCCH. In one aspect the RS may indicate the repetition factor of the PUCCH associated with the PDSCH scheduled by the PDCCH. In one aspects, the RS may indicate the UE 402 to apply the dynamic PUCCH repetition factor received at 408 to PUCCH that is not associated with the PDSCH scheduled by the PDCCH. The one or more parameters of the RS may indicate that the dynamic PUCCH repetition factor is applicable to a PUCCH type.

At 412, the base station 404 may transmit, to the UE 402, the PDSCH associated with the PUCCH transmitted at 408. The UE 402 may receive, from the base station 404, the PDSCH associated with the PUCCH received at 408. That is, the PDSCH may be transmitted or received based on the scheduled or dynamic grant of PDCCH received at 408.

At 414, the UE 402 may determine or extract the repetition factor for a PUCCH based on at least one parameter of the RS transmitted with the PDCCH. The at least one parameter of the RS may be based on the RRC received at 406, and include one or more of an RS sequence, a port for the RS, or an OCC applied to the RS. In one aspect, the RS sequence of the RS may indicate the repetition factor for the PUCCH. In another aspect, the RS port from which the base station 404 transmits the RS may indicate the repetition factor for the PUCCH. In another aspect, the OCC of the RS may indicate the repetition factor for the PUCCH.

In some aspects, a relationship between the RS received with the PDCCH and the repetition factor of the PUCCH may be based on one or more properties of a corresponding PUCCH. In one aspect, the relationship between the RS received with the PDCCH and the repetition factor of the PUCCH may be based on a PUCCH resource set configuration. In another aspect, the relationship between the RS received with the PDCCH and the repetition factor of the PUCCH may be based on a size of UCI comprised in the PUCCH. In another aspect, the relationship between the RS received with the PDCCH and the repetition factor of the PUCCH may be based on a content of the UCI comprised in the PUCCH. In another aspect, the relationship between the RS received with the PDCCH and the repetition factor of the PUCCH is based on a PUCCH format for the PUCCH.

In some aspects, the relationship between the RS received with the PDCCH and the repetition factor of the PUCCH may be based on one or more properties of the PDCCH. In one aspect, the relationship between the RS received with the PDCCH and the repetition factor of the PUCCH may be based on a search space associated with the PDCCH. In another aspect, the relationship between the RS received with the PDCCH and the repetition factor of the PUCCH may be based on a control resource set (CORESET) configuration for the PDCCH. In another aspect, the relationship between the RS received with the PDCCH and the repetition factor of the PUCCH may be based on a size of DCI in the PDCCH.

At 416, the UE 402 may repeat transmission of the PUCCH to the base station 404 based on a repetition factor indicated by the RS associated with the PDCCH. The base station 404 may receive, from the UE 402, repeated transmissions of the PUCCH based on the repetition factor indicated by the RS associated with the PDCCH. Here, the PUCCH for which the repetition factor is indicated may carry ACK/NACK feedback for the PDSCH scheduled by the PDCCH. The repetition factor may be determined or extracted based on at least one parameter of the RS transmitted with the PDCCH. The at least one parameter of the RS may be based on the RRC received at 406, and include one or more of an RS sequence, a port for the RS, or an OCC applied to the RS. In one aspect, the relationship between the RS received with the PDCCH and the repetition factor of the PUCCH may be based on one or more properties of a corresponding PUCCH. In another aspect, the relationship between the RS received with the PDCCH and the repetition factor of the PUCCH may be based on one or more properties of the PDCCH.

Figure 5:
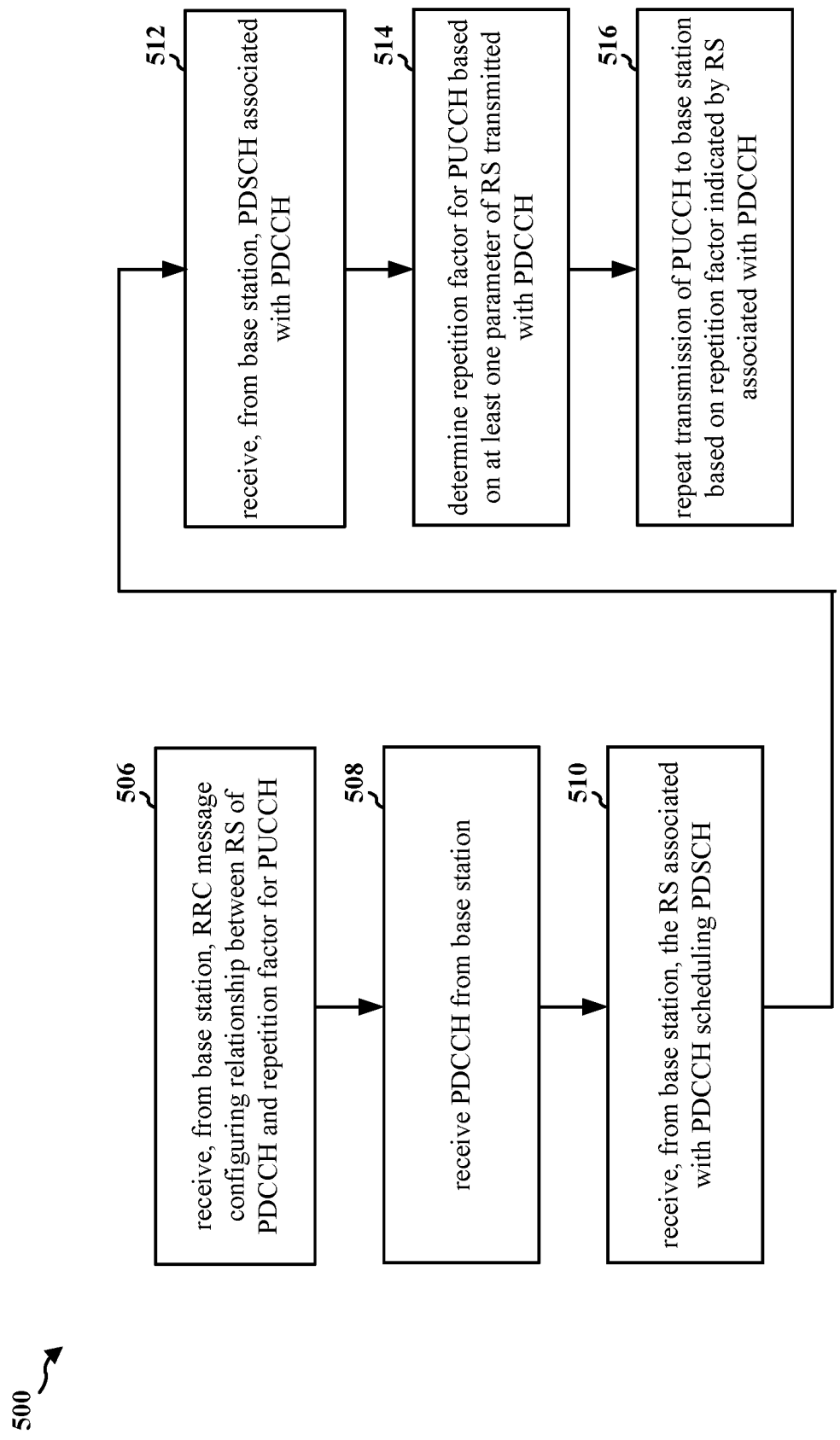
FIG. 5 is a flowchart of a method of wireless communication.

FIG. 5 is a flowchart 500 of a method of wireless communication. The method may be performed by a UE 402 (e.g., the UE 402 104/402; the apparatus 902). The UE 402 may receive, from a base station 404, an RS associated with a PDCCH that schedules a PDSCH, the RS indicating a repetition factor for a PUCCH to the base station 404. The UE 402 may determine the repetition factor for the PUCCH based on at least one parameter of the RS transmitted with the PDCCH, and repeat the transmission of the PUCCH to the base station 404 based on the repetition factor indicated by the RS associated with the PDCCH. The UE 402 may receive, from the base station 404, an RRC configuring the relationship between at least one parameter of the RS and the repetition factor for the PUCCH. The PDCCH may include an indication of a dynamic PUCCH repetition factor, and the RS may indicate the UE 402 to apply the dynamic PUCCH repetition factor. The RS may include the DM-RS received with the PDCCH.

At 506, the UE may receive, from the base station, an RRC message including a configuration of a relationship between at least one parameter of the RS and the repetition factor for the PUCCH. In one aspect, the configuration of the relationship between the at least one parameter of the RS and the repetition factor may be further based on at least one of a PUCCH resource set configuration or a CORESET configuration for the PDCCH. Here, the at least one parameter of the RS may include one or more of an RS sequence, a port for the RS, or an OCC applied to the RS. In one aspect, the RS sequence of the RS may indicate the repetition factor for the PUCCH. In another aspect, the RS port from which the base station transmits the RS may indicate the repetition factor for the PUCCH. In another aspect, the OCC of the RS may indicate the repetition factor for the PUCCH. For example, at 406, the UE 402 may receive, from the base station 404, an RRC message including a configuration of a relationship between at least one parameter of the RS and the repetition factor for the PUCCH. Furthermore, 506 may be performed by an RRC component 940.

At 508, the UE may receive, from the base station, the PDCCH for scheduling a PDSCH. In one example, the PDCCH may include DCI including the indication of the dynamic PUCCH repetition factor. In another example, the indication of the dynamic PUCCH repetition factor may include at least one of an aggregation level of the PDCCH or a location of a first CCE of the PDCCH. For example, at 408, the UE 402 may receive, from the base station 404, the PDCCH for scheduling a PDSCH. Furthermore, 508 may be performed by a downlink channel component 942.

At 510, the UE may receive, from the base station, an RS associated with the PDCCH scheduling a PDSCH. The RS may include a DMRS transmitted with the PDCCH. In one aspect the RS may indicate the repetition factor of the PUCCH associated with the PDSCH scheduled by the PDCCH. In one aspects, the RS may indicate the UE to apply the dynamic PUCCH repetition factor received at 508 to PUCCH that is not associated with the PDSCH scheduled by the PDCCH. The one or more parameters of the RS may indicate that the dynamic PUCCH repetition factor is applicable to a PUCCH type. For example, at 410, the UE 402 may receive, from the base station 404, an RS associated with the PDCCH scheduling a PDSCH. Furthermore, 510 may be performed by an RS component 944.

At 512, the UE may receive, from the base station, the PDSCH associated with the PUCCH received at 508. That is, the PDSCH may be transmitted or received based on the scheduled or dynamic grant of PDCCH received at 508. For example, at 412, the UE 402 may receive, from the base station 404, the PDSCH associated with the PUCCH received at 408. Furthermore, 512 may be performed by the downlink channel component 942.

At 514, the UE may determine or extract the repetition factor for a PUCCH based on at least one parameter of the RS transmitted with the PDCCH. The at least one parameter of the RS may be based on the RRC received at 506, and include one or more of an RS sequence, a port for the RS, or an OCC applied to the RS. In one aspect, the RS sequence of the RS may indicate the repetition factor for the PUCCH. In another aspect, the RS port from which the base station 404 transmits the RS may indicate the repetition factor for the PUCCH. In another aspect, the OCC of the RS may indicate the repetition factor for the PUCCH. In some aspects, a relationship between the RS received with the PDCCH and the repetition factor of the PUCCH may be based on one or more properties of a corresponding PUCCH. In one aspect, the relationship between the RS received with the PDCCH and the repetition factor of the PUCCH may be based on a PUCCH resource set configuration. In another aspect, the relationship between the RS received with the PDCCH and the repetition factor of the PUCCH may be based on a size of UCI comprised in the PUCCH. In another aspect, the relationship between the RS received with the PDCCH and the repetition factor of the PUCCH may be based on a content of the UCI comprised in the PUCCH. In another aspect, the relationship between the RS received with the PDCCH and the repetition factor of the PUCCH is based on a PUCCH format for the PUCCH. In some aspects, the relationship between the RS received with the PDCCH and the repetition factor of the PUCCH based on one or more properties of the PDCCH. In one aspect, the relationship between the RS received with the PDCCH and the repetition factor of the PUCCH may be based on a search space associated with the PDCCH. In another aspect, the relationship between the RS received with the PDCCH and the repetition factor of the PUCCH may be based on a CORESET configuration for the PDCCH. In another aspect, the relationship between the RS received with the PDCCH and the repetition factor of the PUCCH may be based on a size of DCI in the PDCCH. For example, at 414, the UE 402 may determine or extract the repetition factor for a PUCCH based on at least one parameter of the RS transmitted with the PDCCH. Furthermore, 514 may be performed by an uplink channel component 946.

At 516, the UE may repeat transmission of the PUCCH to the base station based on a repetition factor indicated by the RS associated with the PDCCH. Here, the PUCCH for which the repetition factor is indicated may carry ACK/NACK feedback for the PDSCH scheduled by the PDCCH. The repetition factor may be determined or extracted based on at least one parameter of the RS transmitted with the PDCCH. The at least one parameter of the RS may be based on the RRC received at 406, and include one or more of an RS sequence, a port for the RS, or an OCC applied to the RS. In one aspect, the relationship between the RS received with the PDCCH and the repetition factor of the PUCCH may be based on one or more properties of a corresponding PUCCH. In another aspect, the relationship between the RS received with the PDCCH and the repetition factor of the PUCCH may be based on one or more properties of the PDCCH. For example, at 416, the UE 402 may repeat transmission of the PUCCH to the base station 404 based on a repetition factor indicated by the RS associated with the PDCCH. Furthermore, 516 may be performed by the uplink channel component 946.

Figure 6:
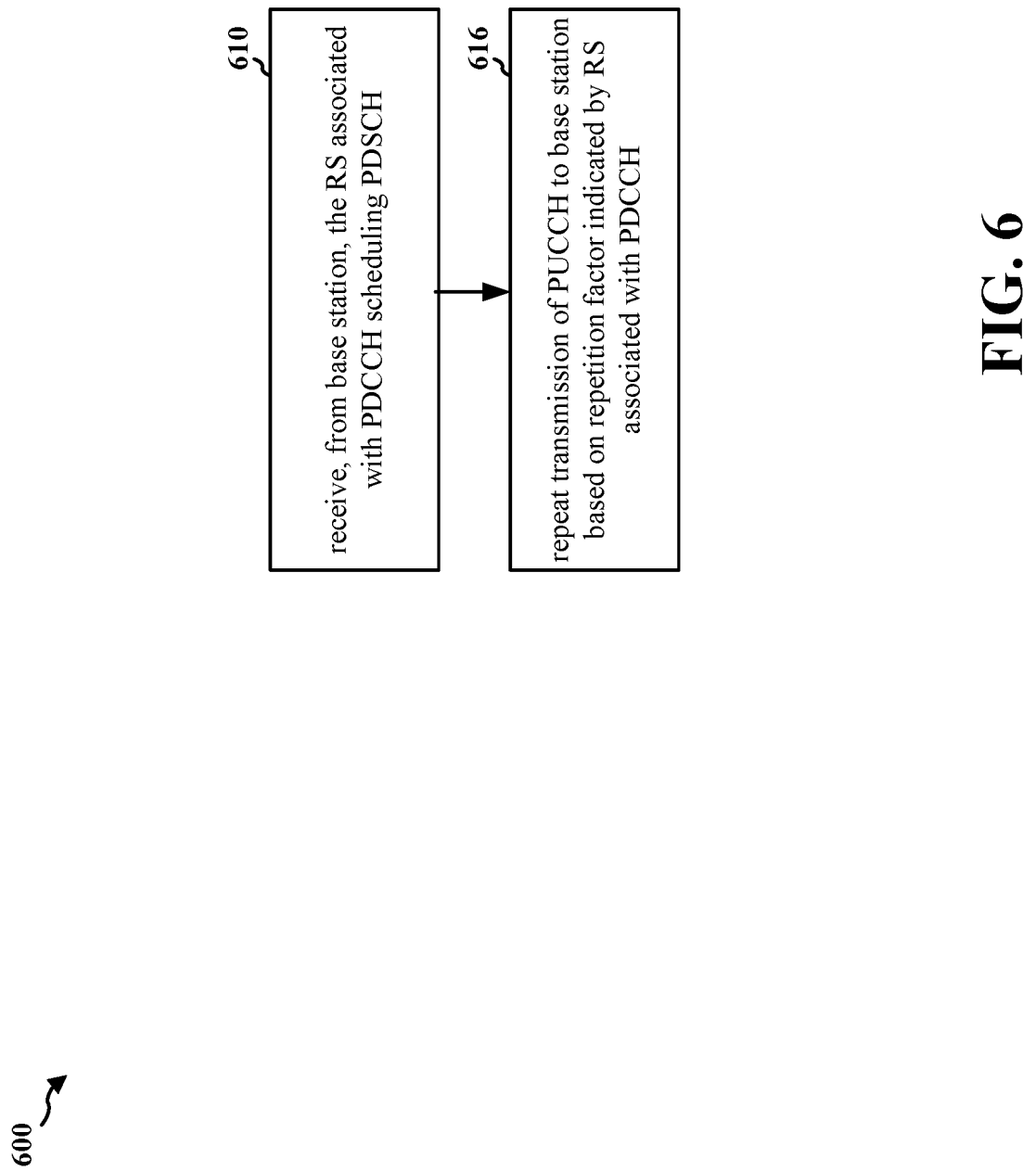
FIG. 6 is a flowchart of a method of wireless communication.

FIG. 6 is a flowchart 600 of a method of wireless communication. The method may be performed by a UE 402 (e.g., the UE 402 104/402; the apparatus 902). The UE 402 may receive, from a base station 404, an RS associated with a PDCCH that schedules a PDSCH, the RS indicating a repetition factor for a PUCCH to the base station 404. The UE 402 may determine the repetition factor for the PUCCH based on at least one parameter of the RS transmitted with the PDCCH, and repeat the transmission of the PUCCH to the base station 404 based on the repetition factor indicated by the RS associated with the PDCCH. The UE 402 may receive, from the base station 404, an RRC configuring the relationship between at least one parameter of the RS and the repetition factor for the PUCCH. The PDCCH may include an indication of a dynamic PUCCH repetition factor, and the RS may indicate the UE 402 to apply the dynamic PUCCH repetition factor. The RS may include the DM-RS received with the PDCCH.

At 610, the UE may receive, from the base station, an RS associated with the PDCCH scheduling a PDSCH. The RS may include a DMRS transmitted with the PDCCH. In one aspect the RS may indicate the repetition factor of the PUCCH associated with the PDSCH scheduled by the PDCCH. In one aspects, the RS may indicate the UE to apply the dynamic PUCCH repetition factor received at 608 to PUCCH that is not associated with the PDSCH scheduled by the PDCCH. The one or more parameters of the RS may indicate that the dynamic PUCCH repetition factor is applicable to a PUCCH type. For example, at 410, the UE 402 may receive, from the base station 404, an RS associated with the PDCCH scheduling a PDSCH. Furthermore, 610 may be performed by an RS component 944.

At 616, the UE may repeat transmission of the PUCCH to the base station based on a repetition factor indicated by the RS associated with the PDCCH. Here, the PUCCH for which the repetition factor is indicated may carry ACK/NACK feedback for the PDSCH scheduled by the PDCCH. The repetition factor may be determined or extracted based on at least one parameter of the RS transmitted with the PDCCH. The at least one parameter of the RS may be based on the RRC received at 406, and include one or more of an RS sequence, a port for the RS, or an OCC applied to the RS. In one aspect, the relationship between the RS received with the PDCCH and the repetition factor of the PUCCH may be based on one or more properties of a corresponding PUCCH. In another aspect, the relationship between the RS received with the PDCCH and the repetition factor of the PUCCH may be based on one or more properties of the PDCCH. For example, at 416, the UE 402 may repeat transmission of the PUCCH to the base station 404 based on a repetition factor indicated by the RS associated with the PDCCH. Furthermore, 616 may be performed by the uplink channel component 946.

Figure 7:
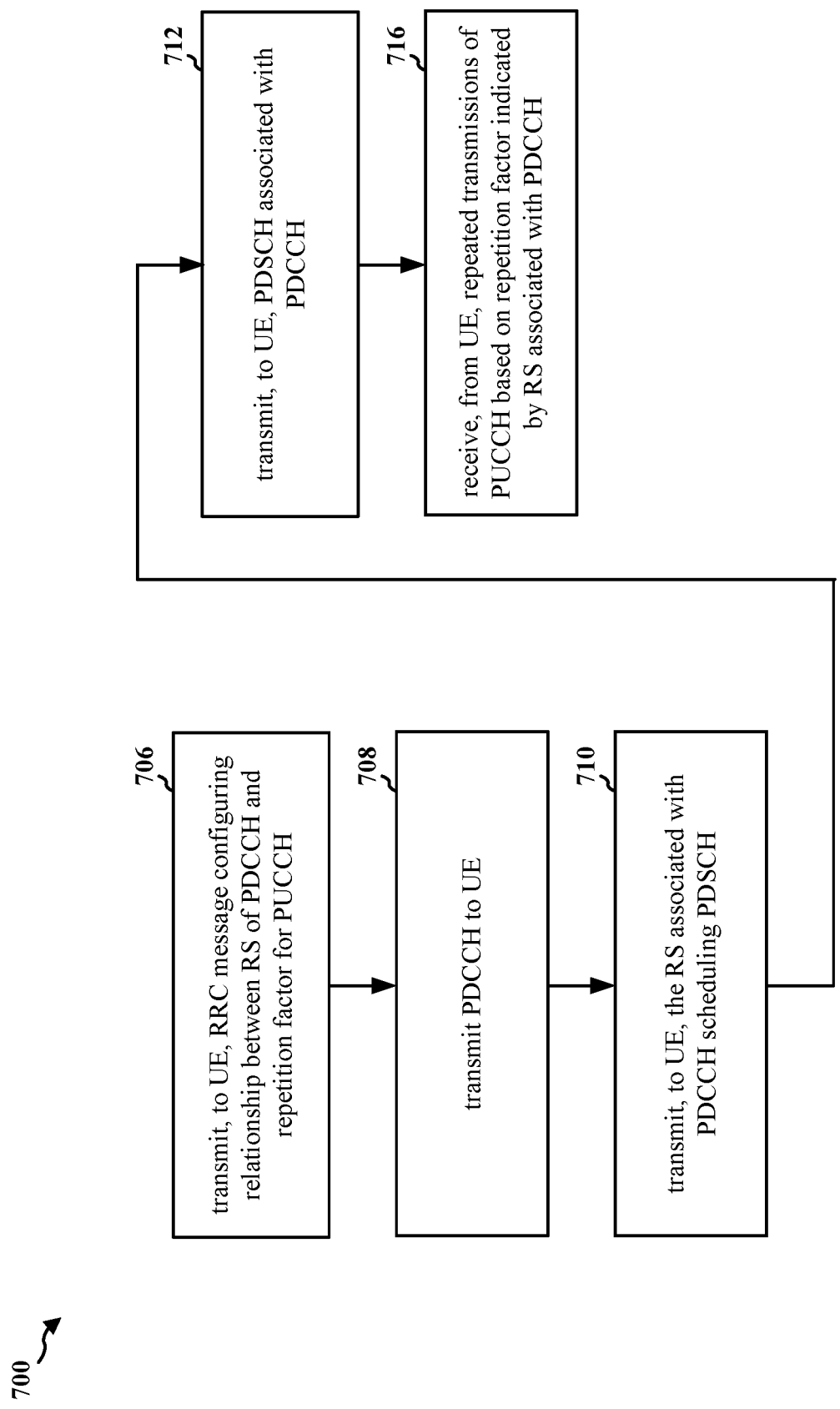
FIG. 7 is a flowchart of a method of wireless communication.

FIG. 7 is a flowchart 700 of a method of wireless communication. The method may be performed by a base station (e.g., the base station 102/180/404; the apparatus 1002). The base station may transmit, to a UE, an RS associated with a PDCCH that schedules a PDSCH, the RS indicating a repetition factor for a PUCCH from the UE. The UE may repeat the transmission of the PUCCH to the base station based on the repetition factor indicated by the RS associated with the PDCCH. The base station may transmit, to the UE, an RRC configuring the relationship between at least one parameter of the RS and the repetition factor for the PUCCH. The PDCCH may include an indication of a dynamic PUCCH repetition factor, and the RS may indicate the UE to apply the dynamic PUCCH repetition factor. The RS may include the DM-RS received with the PDCCH.

At 706, the base station may transmit, to the UE, an RRC message including a configuration of a relationship between at least one parameter of the RS and the repetition factor for the PUCCH. In one aspect, the configuration of the relationship between the at least one parameter of the RS and the repetition factor may be further based on at least one of a PUCCH resource set configuration or a CORESET configuration for the PDCCH. Here, the at least one parameter of the RS may include one or more of an RS sequence, a port for the RS, or an OCC applied to the RS. In one aspect, the RS sequence of the RS may indicate the repetition factor for the PUCCH. In another aspect, the RS port from which the base station transmits the RS may indicate the repetition factor for the PUCCH. In another aspect, the OCC of the RS may indicate the repetition factor for the PUCCH. For example, at 406, the base station 404 may transmit, to the UE 402, an RRC message including a configuration of a relationship between at least one parameter of the RS and the repetition factor for the PUCCH. Furthermore, 706 may be performed by an RRC component 1040.

At 708, the base station may transmit, to a UE, a PDCCH for scheduling a PDSCH. In one aspect, the PDCCH may include an indication of a dynamic PUCCH repetition factor. In one example, the PDCCH may include DCI including the indication of the dynamic PUCCH repetition factor. In another example, the indication of the dynamic PUCCH repetition factor may include at least one of an aggregation level of the PDCCH or a location of a first CCE of the PDCCH. For example, at 408, the base station 404 may transmit, to a UE 402, a PDCCH for scheduling a PDSCH. Furthermore, 708 may be performed by a downlink channel component 1042.

At 710, the base station may transmit, to the UE, an RS associated with the PDCCH for scheduling a PDSCH, the RS indicating a repetition factor for a PUCCH from the UE. The RS may include a DMRS transmitted with the PDCCH. In one aspect the RS may indicate the repetition factor of the PUCCH associated with the PDSCH scheduled by the PDCCH. In one aspects, the RS may indicate the UE to apply the dynamic PUCCH repetition factor received at 708 to PUCCH that is not associated with the PDSCH scheduled by the PDCCH. The one or more parameters of the RS may indicate that the dynamic PUCCH repetition factor is applicable to a PUCCH type. For example, at 410, the base station 404 may transmit, to the UE 402, an RS associated with the PDCCH for scheduling a PDSCH, the RS indicating a repetition factor for a PUCCH from the UE 402. Furthermore, 710 may be performed by an RS component 1044.

At 712, the base station may transmit, to the UE, the PDSCH associated with the PUCCH transmitted at 708. That is, the PDSCH may be transmitted or received based on the scheduled or dynamic grant of PDCCH received at 708. For example, at 412, the base station 404 may transmit, to the UE 402, the PDSCH associated with the PUCCH transmitted at 408. Furthermore, 712 may be performed by the downlink channel component 1042.

At 716, the base station may receive, from the UE, repeated transmissions of the PUCCH based on the repetition factor indicated by the RS associated with the PDCCH. Here, the PUCCH for which the repetition factor is indicated may carry ACK/NACK feedback for the PDSCH scheduled by the PDCCH. The repetition factor may be determined or extracted based on at least one parameter of the RS transmitted with the PDCCH. The at least one parameter of the RS may be based on the RRC received at 406, and include one or more of an RS sequence, a port for the RS, or an OCC applied to the RS. In one aspect, the relationship between the RS received with the PDCCH and the repetition factor of the PUCCH may be based on one or more properties of a corresponding PUCCH. In another aspect, the relationship between the RS received with the PDCCH and the repetition factor of the PUCCH may be based on one or more properties of the PDCCH. For example, at 414, the base station 404 may receive, from the UE 402, repeated transmissions of the PUCCH based on the repetition factor indicated by the RS associated with the PDCCH. Furthermore, 716 may be performed by an uplink channel component 1046.

Figure 8:
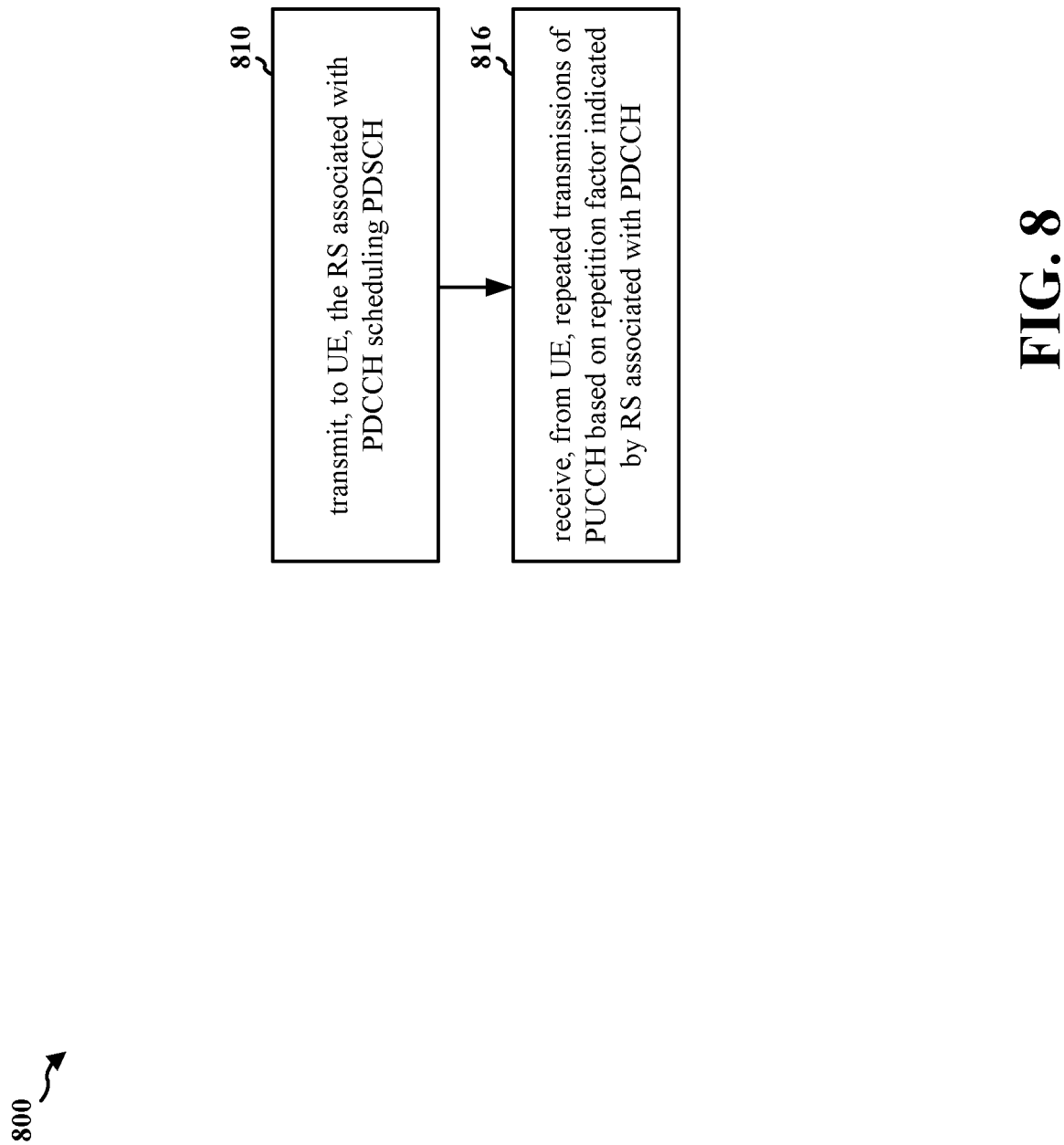
FIG. 8 is a flowchart of a method of wireless communication.

FIG. 8 is a flowchart 800 of a method of wireless communication. The method may be performed by a base station (e.g., the base station 102/180/404; the apparatus 1002). The base station may transmit, to a UE, an RS associated with a PDCCH that schedules a PDSCH, the RS indicating a repetition factor for a PUCCH from the UE. The UE may repeat the transmission of the PUCCH to the base station based on the repetition factor indicated by the RS associated with the PDCCH. The base station may transmit, to the UE, an RRC configuring the relationship between at least one parameter of the RS and the repetition factor for the PUCCH. The PDCCH may include an indication of a dynamic PUCCH repetition factor, and the RS may indicate the UE to apply the dynamic PUCCH repetition factor. The RS may include the DM-RS received with the PDCCH.

At 810, the base station may transmit, to the UE, an RS associated with the PDCCH for scheduling a PDSCH, the RS indicating a repetition factor for a PUCCH from the UE. The RS may include a DMRS transmitted with the PDCCH. In one aspect the RS may indicate the repetition factor of the PUCCH associated with the PDSCH scheduled by the PDCCH. In one aspects, the RS may indicate the UE to apply the dynamic PUCCH repetition factor received at 808 to PUCCH that is not associated with the PDSCH scheduled by the PDCCH. The one or more parameters of the RS may indicate that the dynamic PUCCH repetition factor is applicable to a PUCCH type. For example, at 410, the base station 404 may transmit, to the UE 402, an RS associated with the PDCCH for scheduling a PDSCH, the RS indicating a repetition factor for a PUCCH from the UE 402. Furthermore, 810 may be performed by an RS component 1044.

At 816, the base station may receive, from the UE, repeated transmissions of the PUCCH based on the repetition factor indicated by the RS associated with the PDCCH. Here, the PUCCH for which the repetition factor is indicated may carry ACK/NACK feedback for the PDSCH scheduled by the PDCCH. The repetition factor may be determined or extracted based on at least one parameter of the RS transmitted with the PDCCH. The at least one parameter of the RS may be based on the RRC received at 406, and include one or more of an RS sequence, a port for the RS, or an OCC applied to the RS. In one aspect, the relationship between the RS received with the PDCCH and the repetition factor of the PUCCH may be based on one or more properties of a corresponding PUCCH. In another aspect, the relationship between the RS received with the PDCCH and the repetition factor of the PUCCH may be based on one or more properties of the PDCCH. For example, at 414, the base station 404 may receive, from the UE 402, repeated transmissions of the PUCCH based on the repetition factor indicated by the RS associated with the PDCCH. Furthermore, 816 may be performed by an uplink channel component 1046.

Figure 9:
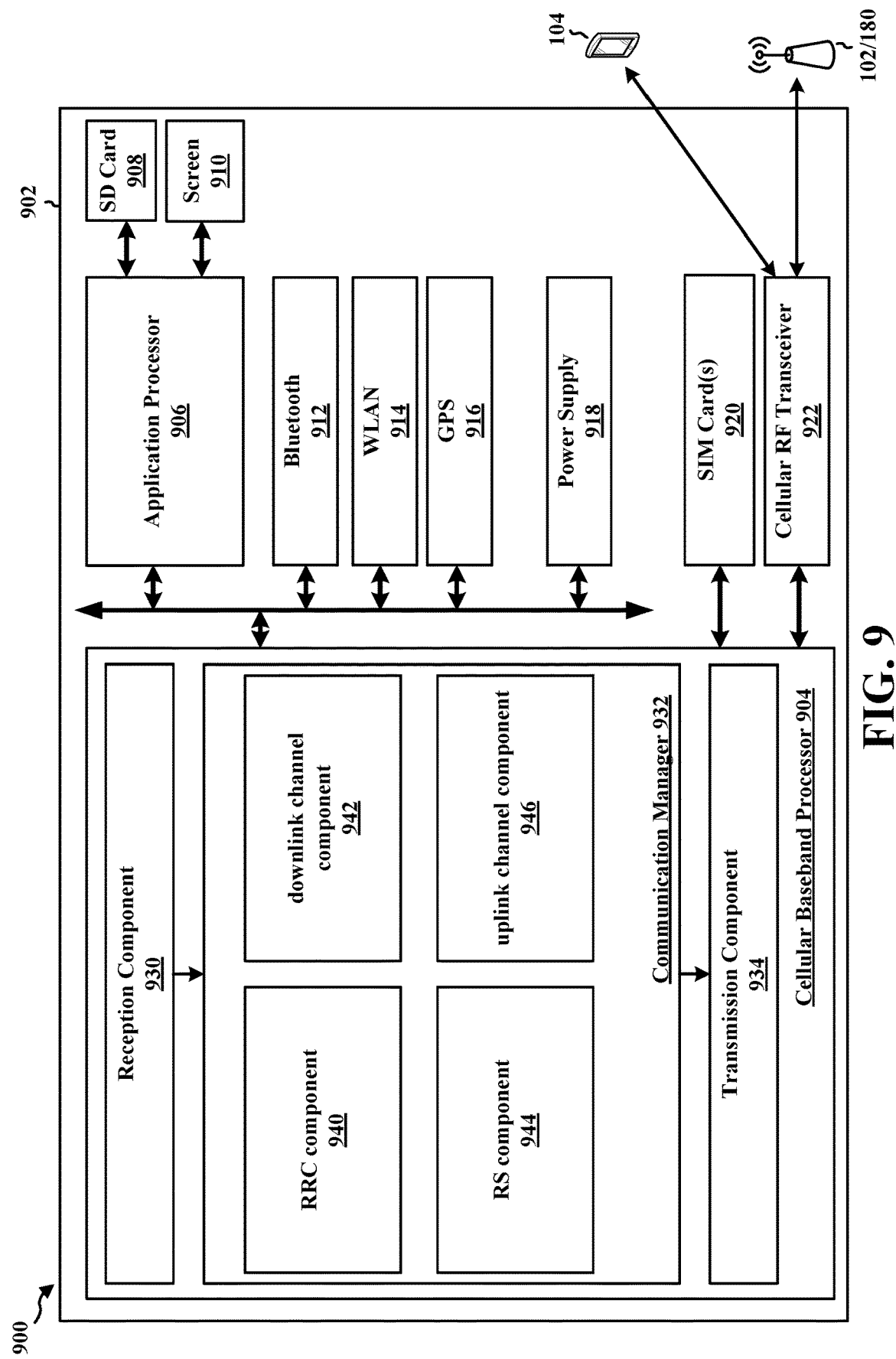
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes an RRC component 940 that is configured to receive an RRC message including a configuration of a relationship between at least one parameter of the RS and the repetition factor for the PUCCH, e.g., as described in connection with 506. The communication manager 932 includes a downlink channel component 942 that is configured to receive the PDCCH for scheduling a PDSCH, and receive, from the base station, the PDSCH associated with the PUCCH, e.g., as described in connection with 508 and 512. The communication manager 932 includes an RS component 944 that is configured to receive an RS associated with the PDCCH scheduling a PDSCH, e.g., as described in connection with 510 and 610. The communication manager 932 includes an uplink channel component 946 that is configured to determine or extract the repetition factor for a PUCCH based on at least one parameter of the RS transmitted with the PDCCH, and repeat transmission of the PUCCH to the base station based on a repetition factor indicated by the RS associated with the PDCCH, e.g., as described in connection with 514, 516 and 616.

The apparatus may include additional components that perform each of the blocks of the algorithm in the flowcharts of FIGS. 4, 5, and 6. As such, each block in the flowcharts of FIGS. 4, 5, and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for receiving, from a base station, RS associated with a PDCCH scheduling a PDSCH, means for determining the repetition factor for the PUCCH based on at least one parameter of the RS transmitted with the PDCCH, and means for repeating transmission of a PUCCH to the base station based on a repetition factor indicated by the RS associated with the PDCCH. The apparatus 902 means for receiving an RRC message from the base station, the RRC message including a configuration of a relationship between at least one parameter of the RS and the repetition factor for the PUCCH, and means for receiving, from the base station, the PDCCH including an indication of a dynamic PUCCH repetition factor. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
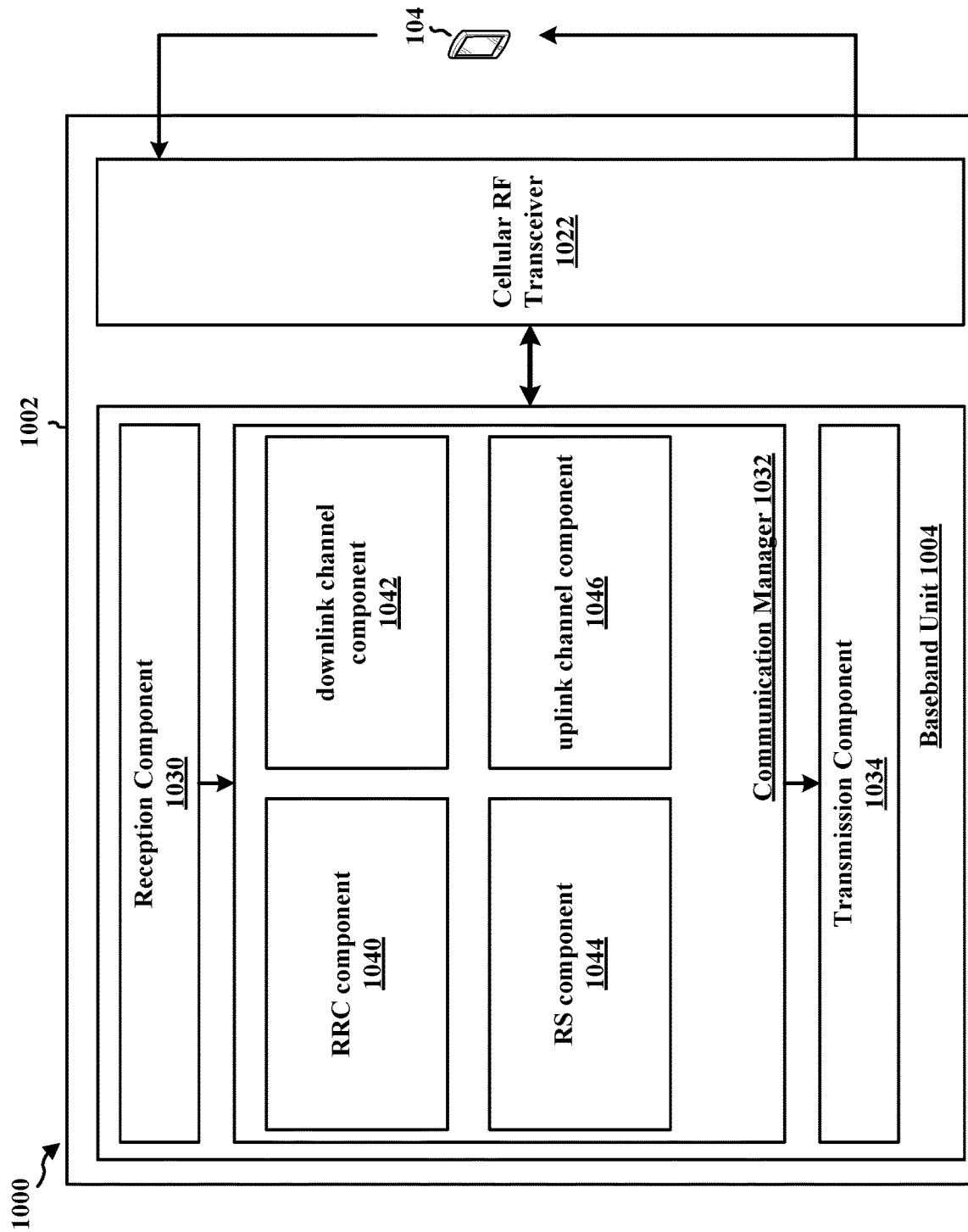
FIG. 10 is a diagram illustrating an example of a hardware implementation for an example apparatus.

FIG. 10 is a diagram 1000 illustrating an example of a hardware implementation for an apparatus 1002. The apparatus 1002 may be a base station, a component of a base station, or may implement base station functionality. In some aspects, the apparatus 902 may include a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes an RRC component 1040 that is configured to transmit an RRC message including a configuration of a relationship between at least one parameter of the RS and the repetition factor for the PUCCH, e.g., as described in connection with 706. The communication manager 1032 includes a downlink channel component 1042 that is configured to transmit a PDCCH for scheduling a PDSCH, and transmit the PDSCH associated with the transmitted PUCCH, e.g., as described in connection with 708 and 712. The communication manager 1032 includes an RS component 1044 that is configured to transmit an RS associated with the PDCCH for scheduling a PDSCH, e.g., as described in connection with 710 and 810. The communication manager 1032 includes an uplink channel component 1046 that is configured to receive repeated transmissions of the PUCCH based on the repetition factor indicated by the RS associated with the PDCCH, e.g., as described in connection with 716 and 816.

The apparatus may include additional components that perform each of the blocks of the algorithm in the flowcharts of FIGS. 5, 7, and 8. As such, each block in the flowcharts of FIGS. 5, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for transmitting, to a UE, an RS associated with a PDCCH for scheduling a PDSCH, the RS indicating a repetition factor for a PUCCH from the UE, and means for receiving, from the UE, repeated transmissions of the PUCCH based on the repetition factor indicated by the RS associated with the PDCCH. The apparatus 1002 includes means for transmitting an RRC message to the UE, the RRC message including a configuration of a relationship between at least one parameter of the RS and the repetition factor for the PUCCH, and means for transmitting, to the UE, the PDCCH including an indication of a dynamic PUCCH repetition factor. The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

According to FIGS. 4, 5, 6, 7, and 8, The base station may transmit, to the UE, a reference signal (RS) associated with a physical downlink control channel (PDCCH) that schedules a physical downlink shared channel (PDSCH), the RS indicating a repetition factor for a physical uplink control channel (PUCCH) from the UE. The RS may include the demodulation RS (DM-RS) received with the PDCCH.

The UE may determine the repetition factor for the PUCCH based on at least one parameter of the RS transmitted with the PDCCH, and repeat the transmission of the PUCCH to the base station based on the repetition factor indicated by the RS associated with the PDCCH. At least one parameter of the RS indicating the repetition factor for the PDCCH may include one or more of an RS sequence, a port for the RS from which the base station transmits the RS, or an orthogonal cover code (OCC) applied to the RS.

The relationship between the and the repetition factor of the PUCCH may be configured based on one or more properties of the corresponding PUCCH, and the properties of the corresponding PUCCH may include a PUCCH resource set configuration, a size or content of uplink control information (UCI) included in the PUCCH, or a PUCCH format for the PUCCH. The relationship between the RS and the repetition factor of the PUCCH may also be configured based on one or more properties of the PDCCH, and the properties of the PDCCH may include a search space associated with the PDCCH, a control resource set (CORESET) configuration for the PDCCH, or a downlink control information (DCI) size included in the PDCCH.

The base station may transmit an RRC configuring the relationship between at least one parameter of the RS and the repetition factor for the PUCCH. The PDCCH may include an indication of a dynamic PUCCH repetition factor, and the RS may indicate the UE to apply the dynamic PUCCH repetition factor to the PUCCH that is not associated with the PDSCH scheduled by the PDCCH. The indication of the dynamic PUCCH repetition factor may be included in the DCI. The dynamic PUCCH repetition factor includes at least one of aggregation level of the PDCCH or a location of a first CCE of the PDCCH.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to a memory and configured to transmit, to a UE, an RS associated with a PDCCH for scheduling a PDSCH, the RS indicating a repetition factor for a PUCCH from the UE, and receive, from the UE, repeated transmissions of the PUCCH based on the repetition factor indicated by the RS associated with the PDCCH.

Aspect 2 is the apparatus of aspect 1, where the RS includes a DM-RS transmitted with the PDCCH.

Aspect 3 is the apparatus of any of aspects 1 and 2, where an RS sequence of the RS indicates the repetition factor for the PUCCH.

Aspect 4 is the apparatus of any of aspects 1 to 3, where an RS port from which the base station transmits the RS indicates the repetition factor for the PUCCH.

Aspect 5 is the apparatus of any of aspects 1 to 4, where an OCC of the RS indicates the repetition factor for the PUCCH.

Aspect 6 is the apparatus of any of aspects 1 to 5, where the at least one processor is further configured to transmit an RRC message to the UE, the RRC message including a configuration of a relationship between at least one parameter of the RS and the repetition factor for the PUCCH.

Aspect 7 is the apparatus of aspect 6, where the at least one parameter of the RS includes one or more of an RS sequence, a port for the RS, or an OCC applied to the RS.

Aspect 8 is the apparatus of any of aspects 6 and 7, where the configuration of the relationship between the at least one parameter of the RS and the repetition factor is further based on at least one of a PUCCH resource set configuration or a CORESET configuration for the PDCCH.

Aspect 9 is the apparatus of any of aspects 1 to 8, where a relationship between the RS transmitted with the PDCCH and the repetition factor of the PUCCH is based on one or more properties of a corresponding PUCCH.

Aspect 10 is the apparatus of aspect 9, where the relationship between the RS transmitted with the PDCCH and the repetition factor of the PUCCH is based on a PUCCH resource set configuration.

Aspect 11 is the apparatus of any of aspects 9 and 10, where the relationship between the RS transmitted with the PDCCH and the repetition factor of the PUCCH is based on a size of UCI included in the PUCCH.

Aspect 12 is the apparatus of any of aspects 9 to 11, where the relationship between the RS transmitted with the PDCCH and the repetition factor of the PUCCH is based on content UCI included in the PUCCH.

Aspect 13 is the apparatus of any of aspects 9 to 12, where the relationship between the RS transmitted with the PDCCH and the repetition factor of the PUCCH is based on a PUCCH format for the PUCCH.

Aspect 14 is the apparatus of any of aspects 1 to 13, where a relationship between the RS transmitted with the PDCCH and the repetition factor of the PUCCH based on one or more properties of the PDCCH.

Aspect 15 is the apparatus of aspect 14, where the relationship between the RS transmitted with the PDCCH and the repetition factor of the PUCCH is based on a search space associated with the PDCCH.

Aspect 16 is the apparatus of any of aspects 14 and 15, where the relationship between the RS transmitted with the PDCCH and the repetition factor of the PUCCH is based on a CORESET configuration for the PDCCH.

Aspect 17 is the apparatus of any of aspects 14 to 16, where the relationship between the RS transmitted with the PDCCH and the repetition factor of the PUCCH is based on a DCI size included in the PDCCH.

Aspect 18 is the apparatus of any of aspects 1 to 17, where the PUCCH for which the repetition factor is indicated carries ACK/NACK feedback for the PDSCH scheduled by the PDCCH.

Aspect 19 is the apparatus of any of aspects 1 to 18, where the at least one processor is further configured to transmit, to the UE, the PDCCH including an indication of a dynamic PUCCH repetition factor, where the RS indicates the UE to apply the dynamic PUCCH repetition factor to the PUCCH that is not associated with the PDSCH scheduled by the PDCCH.

Aspect 20 is the apparatus of aspect 19, where one or more parameters of the RS indicates that the dynamic PUCCH repetition factor is applicable to a PUCCH type.

Aspect 21 is the apparatus of any of aspects 19 and 20, where the indication of the dynamic PUCCH repetition factor is included in DCI.

Aspect 22 is the apparatus of any of aspects 19 to 21, where the indication of the dynamic PUCCH repetition factor includes at least one of an aggregation level of the PDCCH or a location of a first CCE of the PDCCH.

Aspect 23 is a method of wireless communication for implementing any of aspects 1 to 22.

Aspect 24 is an apparatus for wireless communication including means for implementing any of aspects 1 to 22.

Aspect 25 is a computer-readable medium storing computer executable code, where the code when executed by a processor causes the processor to implement any of aspects 1 to 22.

Aspect 26 is an apparatus of wireless communication at a UE including at least one processor coupled to a memory and configured to receive, from a base station, RS associated with a PDCCH scheduling a PDSCH, and repeat transmission of a PUCCH to the base station based on a repetition factor indicated by the RS associated with the PDCCH.

Aspect 27 is the apparatus of aspect 26, where the at least one processor is further configured to extract the repetition factor for the PUCCH based on at least one parameter of the RS transmitted with the PDCCH.

Aspect 28 is the apparatus of any of aspects 26 and 27, where the RS includes a DM-RS received with the PDCCH.

Aspect 29 is the apparatus of any of aspects 26 to 28, where an RS sequence of the RS indicates the repetition factor for the PUCCH.

Aspect 30 is the apparatus of any of aspects 26 to 29, where an RS port from which the base station transmits the RS indicates the repetition factor for the PUCCH.

Aspect 31 is the apparatus of any of aspects 26 to 30, where an OCC of the RS indicates the repetition factor for the PUCCH.

Aspect 32 is the apparatus of any of aspects 26 to 31, where the at least one processor is further configured to receive an RRC message from the base station, the RRC message including a configuration of a relationship between at least one parameter of the RS and the repetition factor for the PUCCH.

Aspect 33 is the apparatus of aspect 32, where the at least one parameter of the RS includes one or more of an RS sequence, a port for the RS, or an OCC applied to the RS.

Aspect 34 is the apparatus of any of aspects 32 and 33, where the configuration of the relationship between the at least one parameter of the RS and the repetition factor is further based on at least one of a PUCCH resource set configuration or a CORESET configuration for the PDCCH.

Aspect 35 is the apparatus of any of aspects 26 to 34, where a relationship between the RS received with the PDCCH and the repetition factor of the PUCCH is based on one or more properties of a corresponding PUCCH.

Aspect 36 is the apparatus of aspects 35, where the relationship between the RS received with the PDCCH and the repetition factor of the PUCCH is based on a PUCCH resource set configuration.

Aspect 37 is the apparatus of any of aspects 35 and 36, where the relationship between the RS received with the PDCCH and the repetition factor of the PUCCH is based on a size of UCI included in the PUCCH.

Aspect 38 is the apparatus of any of aspects 35 to 37, where the relationship between the RS received with the PDCCH and the repetition factor of the PUCCH is based on content UCI included in the PUCCH.

Aspect 39 is the apparatus of any of aspects 35 to 38, where the relationship between the RS received with the PDCCH and the repetition factor of the PUCCH is based on a PUCCH format for the PUCCH.

Aspect 40 is the apparatus of any of aspects 26 to 39, where a relationship between the RS received with the PDCCH and the repetition factor of the PUCCH based on one or more properties of the PDCCH.

Aspect 41 is the apparatus of aspect 40, where the relationship between the RS received with the PDCCH and the repetition factor of the PUCCH is based on a search space associated with the PDCCH.

Aspect 42 is the apparatus of any of aspects 40 to 41, where the relationship between the RS received with the PDCCH and the repetition factor of the PUCCH is based on a CORESET configuration for the PDCCH.

Aspect 43 is the apparatus of any of aspects 40 to 42, where the relationship between the RS received with the PDCCH and the repetition factor of the PUCCH is based on a DCI size included in the PDCCH.

Aspect 44 is the apparatus of any of aspects 26 to 43, where the PUCCH for which the repetition factor is indicated carries ACK/NACK feedback for the PDSCH scheduled by the PDCCH.

Aspect 45 is the apparatus of any of aspects 26 to 44, where the at least one processor is further configured to receive, from the base station, the PDCCH including an indication of a dynamic PUCCH repetition factor, where the RS indicates the UE to apply the dynamic PUCCH repetition factor to the PUCCH that is not associated with the PDSCH scheduled by the PDCCH.

Aspect 46 is the apparatus of aspect 45, where one or more parameters of the RS indicates that the dynamic PUCCH repetition factor is applicable to a PUCCH type.

Aspect 47 is the apparatus of aspect 46, where the indication of the dynamic PUCCH repetition factor is included in DCI.

Aspect 48 is the apparatus of aspect 46 and 47, where the indication of the dynamic PUCCH repetition factor includes at least one of an aggregation level of the PDCCH or a location of a first CCE of the PDCCH.

Aspect 49 is a method of wireless communication for implementing any of aspects 26 to 48.

Aspect 50 is an apparatus for wireless communication including means for implementing any of aspects 26 to 48.

Aspect 51 is a computer-readable medium storing computer executable code, where the code when executed by a processor causes the processor to implement any of aspects 26 to 48.

What is claimed is:

1. An apparatus of wireless communication at a user equipment (UE), comprising:
   memory; and
   at least one processor coupled to the memory and configured to:
     receive, from a base station, a reference signal (RS) associated with a physical downlink control channel (PDCCH) transmission that schedules a physical downlink shared channel (PDSCH) transmission; and
     transmit a physical uplink control channel (PUCCH) transmission with a repetition factor indicated by at least one parameter of the RS received with the PDCCH transmission.

2. The apparatus of claim 1, wherein the RS includes a demodulation RS (DMRS) received with the PDCCH transmission.

3. The apparatus of claim 1, wherein the at least one parameter of the RS that indicates the repetition factor includes one or more of:
   an RS sequence of the RS,
   an RS port from which the base station transmits the RS, or
   an orthogonal cover code (OCC) of the RS.

4. The apparatus of claim 1, wherein the at least one processor is further configured to:
   receive a radio resource control (RRC) message from the base station, wherein the RRC message includes a configuration of a relationship between the at least one parameter of the RS and the repetition factor for the PUCCH transmission.

5. The apparatus of claim 4, wherein the configuration of the relationship between the at least one parameter of the RS and the repetition factor is further based on at least one of a PUCCH resource set configuration or a control resource set (CORESET) configuration for the PDCCH transmission.

6. The apparatus of claim 1, wherein a relationship between the RS received with the PDCCH transmission and the repetition factor of the PUCCH is based on one or more properties of a corresponding PUCCH transmission.

7. The apparatus of claim 6, wherein the relationship between the RS received with the PDCCH transmission and the repetition factor of the PUCCH transmission is based on a PUCCH resource set configuration including at least one of:
   a size of uplink control information (UCI) comprised in the PUCCH transmission,
   a content of the UCI comprised in the PUCCH transmission, or
   a PUCCH format for the PUCCH transmission.

8. The apparatus of claim 1, wherein a relationship between the RS received with the PDCCH transmission and the repetition factor of the PUCCH transmission based on one or more properties of the PDCCH transmission including at least one of:
   a search space associated with the PDCCH transmission,
   a control resource set (CORESET) configuration for the PDCCH transmission, or
   a size of downlink control information (DCI) in the PDCCH transmission.

9. The apparatus of claim 1, wherein the PUCCH transmission for which the repetition factor is indicated carries acknowledgement (ACK)/negative acknowledgement (NACK) feedback for the PDSCH transmission scheduled by the PDCCH transmission.

10. The apparatus of claim 1, wherein the at least one processor is further configured to:
    receive, from the base station, the PDCCH transmission including an indication of a dynamic PUCCH repetition factor,
    wherein the RS indicates for the UE to apply the dynamic PUCCH repetition factor to the PUCCH transmission that is not associated with the PDSCH transmission scheduled by the PDCCH transmission.

11. The apparatus of claim 10, wherein one or more parameters of the RS indicates that the dynamic PUCCH repetition factor is applicable to a PUCCH type.

12. The apparatus of claim 11, wherein the indication of the dynamic PUCCH repetition factor is comprised in downlink control information (DCI).

13. The apparatus of claim 12, wherein the indication of the dynamic PUCCH repetition factor includes at least one of an aggregation level of the PDCCH transmission or a location of a first control channel element (CCE) of the PDCCH transmission.

14. An method of wireless communication at a user equipment (UE), comprising:
receiving, from a base station, reference signal (RS) associated with a physical downlink control channel (PDCCH) transmission that schedules a physical downlink shared channel (PDSCH) transmission; and
transmitting a physical uplink control channel (PUCCH) transmission with a repetition factor indicated by at least one parameter of the RS received with the PDCCH transmission.

15. The method of claim 14, wherein the RS includes a demodulation RS (DMRS) received with the PDCCH transmission.

16. The method of claim 14, wherein at least one of an RS sequence of the RS, an RS port from which the base station transmits the RS, or an orthogonal cover code (OCC) of the RS indicate the repetition factor for the PUCCH transmission.

17. The method of claim 14, further comprising:
receiving a radio resource control (RRC) message from the base station, the RRC message including a configuration of a relationship between the at least one parameter of the RS and the repetition factor for the PUCCH transmission.

18. The method of claim 17, wherein the configuration of the relationship between the at least one parameter of the RS and the repetition factor is further based on at least one of a PUCCH resource set configuration or a control resource set (CORESET) configuration for the PDCCH transmission.

19. The method of claim 14, wherein a relationship between the RS received with the PDCCH transmission and the repetition factor of the PUCCH transmission is based on one or more properties of a corresponding PUCCH transmission.

20. The method of claim 19, wherein the relationship between the RS received with the PDCCH transmission and the repetition factor of the PUCCH transmission is based on a PUCCH resource set configuration including at least one of:
a size of uplink control information (UCI) comprised in the PUCCH transmission,
a content of the UCI comprised in the PUCCH transmission, or
a PUCCH format for the PUCCH transmission.

21. The method of claim 14, wherein a relationship between the RS received with the PDCCH transmission and the repetition factor of the PUCCH transmission is based on one or more properties of the PDCCH transmission including at least one of:
a search space associated with the PDCCH transmission,
a control resource set (CORESET) configuration for the PDCCH transmission, and
a size of downlink control information (DCI) in the PDCCH transmission.

22. The method of claim 14, wherein the PUCCH transmission for which the repetition factor is indicated carries acknowledgement (ACK)/negative acknowledgement (NACK) feedback for the PDSCH transmission scheduled by the PDCCH transmission.

23. The method of claim 14, further comprising:
receiving, from the base station, the PDCCH transmission including an indication of a dynamic PUCCH repetition factor,
wherein the RS indicates for the UE to apply the dynamic PUCCH repetition factor to the PUCCH transmission that is not associated with the PDSCH transmission scheduled by the PDCCH transmission.

24. The method of claim 23, wherein one or more parameters of the RS indicates that the dynamic PUCCH repetition factor is applicable to a PUCCH type.

25. The method of claim 24, wherein the indication of the dynamic PUCCH repetition factor is comprised in downlink control information (DCI).

26. The method of claim 25, wherein the indication of the dynamic PUCCH repetition factor includes at least one of an aggregation level of the PDCCH transmission or a location of a first control channel element (CCE) of the PDCCH transmission.

27. An apparatus for wireless communication at a base station, comprising:
memory; and
at least one processor coupled to the memory and configured to:
transmit, to a user equipment (UE), a reference signal (RS) associated with a physical downlink control channel (PDCCH) transmission for scheduling a physical downlink shared channel (PDSCH) transmission, wherein at least one parameter of the RS indicates a repetition factor for a physical uplink control channel (PUCCH) transmission from the UE; and
receive, from the UE, the PUCCH transmission with the repetition factor indicated by the at least one parameter of the RS transmitted with the PDCCH transmission.

28. The apparatus of claim 27, wherein the at least one processor is further configured to:
transmit a radio resource control (RRC) message to the UE, the RRC message including a configuration of a relationship between the at least one parameter of the RS and the repetition factor for the PUCCH transmission.

29. A method of wireless communication at a base station, comprising:
transmitting, to a user equipment (UE), a reference signal (RS) associated with a physical downlink control channel (PDCCH) transmission for scheduling a physical downlink shared channel (PDSCH) transmission, wherein at least one parameter of the RS indicates a repetition factor for a physical uplink control channel (PUCCH) transmission from the UE; and
receiving, from the UE, the PUCCH transmission with the repetition factor indicated by the at least one parameter of the RS transmitted with the PDCCH transmission.

30. The method of claim 29, further comprising:
transmitting a radio resource control (RRC) message to the UE, the RRC message including a configuration of a relationship between the at least one parameter of the RS and the repetition factor for the PUCCH transmission.

* * * * *